United States Patent [19]
Lee et al.

[11] Patent Number: 5,404,127
[45] Date of Patent: Apr. 4, 1995

[54] POWER LINE COMMUNICATION WHILE AVOIDING DETERMINABLE INTERFERENCE HARMONICS

[75] Inventors: Chin-Chen Lee, San Jose; Howard W. Johnson, Sunnyvale; Philip H. Sutterlin, San Jose, all of Calif.

[73] Assignee: Echelon Corporation, Santa Clara, Calif.

[21] Appl. No.: 167,431

[22] Filed: Dec. 13, 1993

Related U.S. Application Data

[63] Continuation of Ser. No. 698,676, May 10, 1991, abandoned.

[51] Int. Cl.$^6$ .......................................... H04M 11/04
[52] U.S. Cl. ......................... 340/310.02; 340/310.03; 375/261; 375/296; 348/607; 455/3.3; 455/63; 455/114
[58] Field of Search ........ 340/310 R, 310 A, 310 CP; 375/39, 37, 51, 57, 58, 60; 358/167; 455/3.3, 63, 114

[56] References Cited

U.S. PATENT DOCUMENTS

| | | | |
|---|---|---|---|
| 4,261,053 | 4/1981 | Dostis et al. | 375/60 |
| 4,442,530 | 4/1984 | Parrish et al. | 375/53 |
| 4,635,279 | 1/1987 | Nossen | 375/78 |
| 4,644,321 | 2/1987 | Kennon | 340/310 A |
| 4,687,999 | 8/1987 | Desperben et al. | 375/39 |
| 4,745,628 | 5/1988 | McDavid et al. | 375/39 |
| 4,799,238 | 1/1989 | Braun et al. | 340/310 R |
| 4,829,570 | 5/1989 | Schotz | 455/3.3 |
| 4,962,496 | 10/1990 | Vercellotti et al. | 340/310 A |

Primary Examiner—John K. Peng
Assistant Examiner—Nina Tong
Attorney, Agent, or Firm—Blakely, Sokoloff, Taylor & Zafman

[57] ABSTRACT

A power line communication (PLC) apparatus wherein a carrier is derived to avoid determinable interference harmonics. In order to transmit data on a power line containing the television interference or other determinable interference harmonics, the present invention uses redundant carriers at a frequency between the television interference harmonics. In the preferred embodiment, the first carrier is positioned at 118 KHz and the redundant carrier is positioned at 133.7 KHz for the PLC apparatus designed for use in the United States. Other carrier frequencies are used for other countries in order to avoid interference harmonics at a slightly different frequency. The present invention includes a waveshaping and modulation circuit for generating the modulated data waveform for output over the power line. In the preferred embodiment, the waveshaping and modulation circuit includes a waveshape ROM for storing samples that represent the appearance of the carrier waveshape. Once the appropriate waveshape is selected from the waveshape ROM, the 256 discrete points of the waveshape are clocked out an interface line to a DAC, a filter, an amplifier and on to a PLC coupling network for isolating and coupling the signal onto the power line. On the receive side, receive filters are used to separate the received data from determinable interference harmonics. These filters comprise four matched filters, two for each channel. These filters operate in cooperation with the waveshaping and modulation circuitry in order to capture the signals modulated between determinable interference harmonics such as television interference harmonics.

10 Claims, 8 Drawing Sheets

POWER LINE COMMUNICATION WHILE AVOIDING DETERMINABLE INTERFERENCE HARMONICS

This is a continuation of application Ser. No. 07/698,676, filed May 10, 1991, abandoned.

FIELD OF THE INVENTION

The present invention relates to electronic communication systems. Specifically, the present invention relates to power line communication systems.

BACKGROUND OF THE INVENTION

There is a significant advantage to the use of alternating current (AC) power lines for purpose of communication between electronic devices using a power line communication system. Such a power line communication system can be used for monitoring and controlling basic function including energy management, security, and safety control in applications including homes, factories, offices, automobiles and aircraft. Use of existing power lines as a communication medium eliminates installation costs for adding dedicated communication wiring to existing structures.

Prior art power line control systems have been developed for activating and deactivating devices via the power line connection. Success of these prior art control systems has been limited because of their inability to provide a robust and reliable communication system.

One reason for the failure of prior art designs to provide a viable power line communication system is the adverse environment in which power line communication must take place. A typical AC power line network is used for power distribution to a number of electric devices connected thereto. Such devices cover a wide range of applications including hair dryers, television sets, computers and specialized factory tooling. Each type of device conducts a significant level of noise back onto the power lines. Different devices produce different types and degrees of noise. This diverse power line noise problem severely impairs the proper and reliable operation of any power line communication system.

Another problem hindering any power line communication system is signal attenuation. Due in part to the diverse impedance levels of the electric devices being used with a power line network, transmitted communication signals may suffer greater than 40 dB attenuation before being captured by a receiver. The significant signal attenuation problem in combination with the noise problem renders effective signal line communication difficult.

One particularly troublesome source of power line noise is the ubiquitous television set commonly used in the United States, Europe and worldwide. While television sets do not produce the largest magnitude of noise interference on power lines, they do affect a significant percentage of existing power line networks. Raster scan type television sets produce a pulsed power line interference. Each noise pulse corresponds to the completion of a scan line. In television sets conforming to United States' standards, each noise pulse occurs at approximately 15.734 KHz intervals. In European television sets, noise pulses occur at approximately 15.625 KHz intervals. Harmonics of this interference can extend up into the Megahertz region. This television set interference along with signal attenuation are significant reasons for the failure of the prior art to effectively develop a powerful and a reliable power line communication system. A better means and method is needed for implementing a reliable power line communication system while avoiding determinable interference harmonics.

SUMMARY OF THE INVENTION

A power line communication (PLC) apparatus is described wherein a carrier is derived to avoid determinable interference harmonics. In the present invention, a power line communication system may include a circuit breaker panel to which a plurality of power lines are coupled. Electrical outlets may also be connected to the power lines. This power distribution network may be used as communications medium as well as a power distribution means. Thus, data may be transferred from one location on the power distribution network to another location via the power lines. In order to provide the data communications capability, the present invention includes a transmitter/receiver (i.e. transceiver) which is coupled to the power distribution network. The receiver acting in concert with transmitter must be able to isolate valid data from the noise on the power line distribution network.

A significant source of AC power line interference emanates from television receivers. In order to transmit data on a power line containing the television interference or other determinable interference harmonics, the PLC apparatus of the present invention uses redundant carriers at a frequency between the television interference harmonics. In the preferred embodiment, the first carrier is positioned at 118 KHz and the redundant carrier is positioned at 133.7 KHz for the PLC apparatus designed for use in the United States. Other carrier frequencies are used for other countries in order to avoid interference harmonics at a slightly different frequency.

With the invented apparatus, the data is transmitted in its entirety on two channels; that is, there is redundancy in the transmission. All the data (including a preamble) modulates both a 118 KHz carrier and a 133.7 KHz carrier for PLC devices designed for use in the United States. These carriers are specifically chosen at frequencies between the determinable interference harmonics of standard NTSC televisions as described above. Other carrier frequencies are used in other countries to comply with different regulations and other determinable interference harmonics. Quadrature phase shift keying (QPSK) is used to modulate the carriers under most operations. However, binary phase shift keying (BPSK) is also used.

The present invention includes a waveshaping and modulation circuit. The waveshaping and modulation circuit generates the modulated data waveform for output over the power line. In the preferred embodiment, the waveshaping and modulation circuit includes a waveshape ROM for storing samples that represent the appearance of the carrier waveshape. In a phase modulated system, the waveshape ROM stores samples for each phase of the carrier. In order to minimize intersymbol interference, additional storage space in the waveshape ROM is provided for storing a raised cosine waveform that is used to shape the data bits. For each of the sixteen different transmit patterns, 256 discrete time points are stored in the waveshape ROM for representing each of the sixteen transmit waveshapes. In order to generate a desired modulated carrier, one of the sixteen transmit patterns is selected and the associated 256 discrete points defining the waveform are output from the waveshape ROM via an interface to a digital to analog converter (DAC) for conversion to an analog waveform. The sixteen different transmit waveshapes may be represented by four bits and the 256 time points for each waveshape can be represented by an additional eight bits. In this way, the waveshape ROM and the DAC can be used to generate a data modulated carrier whose transmit spectrum fits between television interference harmonics or other determinable interference harmonics. Additional memory space is provided in the waveshape ROM for storing sets of waveshapes corresponding to carriers that avoid either U.S. or European television interference.

Once the appropriate waveshape is selected from the waveshape ROM, the 256 discrete points of the waveshape are clocked out an interface line to a DAC. Data is clocked into the DAC using a control line on which a DAC start signal is transmitted from an I/O buffer and control circuit. The analog output from the DAC is fed to a filter. This filter is provided to smooth the waveshape produced by the stairstep response of the DAC. The output of the filter fed to an amplifier and on to a PLC coupling network for isolating and coupling the signal onto the power line.

On the receive side of the present invention, receive filters are used to separate the received data from determinable interference harmonics. These filters comprise four matched filters, two for each channel. These filters cooperate with the waveshaping and modulation circuitry in order to capture the signals modulated between determinable interference harmonics such as television interference harmonics. In the preferred embodiment, the receive filters are implemented as a pair of filter circuits each having a pair of synchronous demodulators and a pair of low pass filters. One filter circuit is used for each carrier frequency. The low pass filters reject interference harmonics by attenuating the input signal at a predetermined frequency. As the signal is attenuated, the determinable interference harmonics are rejected by the receiver for each of the two carrier frequencies.

It is therefore an object of the present invention to create a robust and reliable power line communication system. It is a further object of the present invention to implement a power line communication system capable of reliably transmitting and receiving information despite the presence of interference generated by a television set or other device producing determinable interference harmonics. It is a further object of the present invention to implement a power line communication system capable of overcoming the signal attenuation problem.

These and other objects of the present invention will become apparent as presented and described in the following detailed description of the preferred embodiment.

DETAILED DESCRIPTION OF THE PREFERRED EMBODIMENT

The present invention is a power line communication (PLC) apparatus wherein a carrier is derived to avoid determinable interference harmonics. In the following description, numerous specific details are set forth in order to provide a thorough understanding of the invention. However, it will be apparent to one with ordinary skill in the art that these specific details need not be used to practice the present invention. In other instances, well-known structures, circuits, frequencies, and interfaces have not been shown in detail in order not to unnecessarily obscure the present invention.

Figure 1:
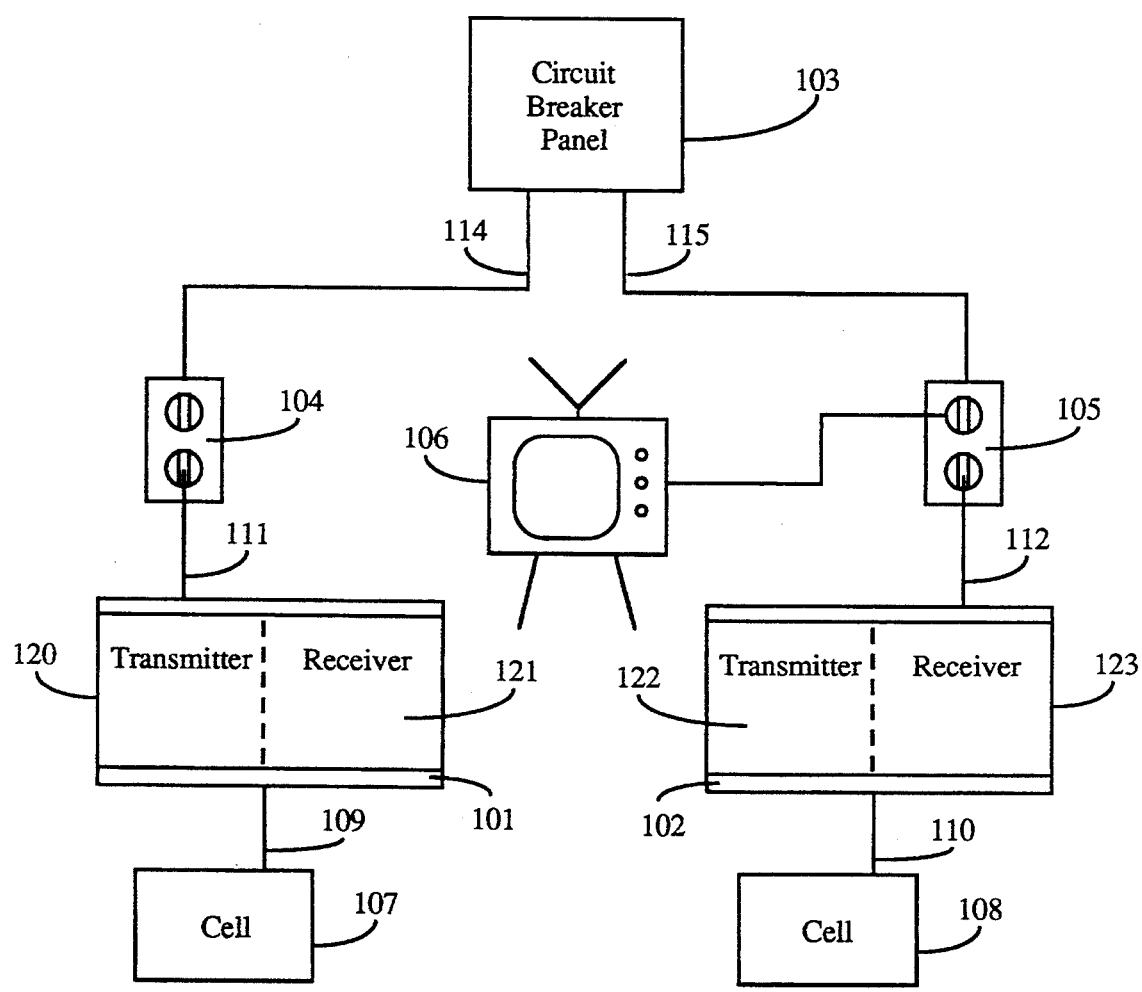
FIG. 1 is an illustration of a typical application of the power line communication system of the present invention.

Referring to FIG. 1, a typical application of the power line communication system of the present invention is shown. A power distribution network such as the simplified network shown in FIG. 1 is typical of those present in most industrial, business and residential structures. In general, such systems include a circuit breaker panel 103 to which a plurality of power lines 114 and 115 are coupled. Typical electrical outlets 104 and 105 may also be connected to power lines 114 and 115. This power distribution network is typically used to distribute 50 or 60 Hz AC power, although in some cases higher frequencies are used such 400 Hz in aircraft or lower frequencies such as 25 Hz in some rail systems. Many different types of electric devices may be coupled to a power distribution network such as the one shown in FIG. 1. A common television set 106 is shown coupled to the outlet 105 in FIG. 1.

The power distribution network may be used as communications medium as well as a power distribution means. Thus, data may be transferred from one location on the power distribution network to another location via lines 114 and/or 115. In order to provide the data communications capability, the present invention includes a transmitter/receiver (i.e. transceiver) 101 and 102. Transceiver 101 is shown coupled to outlet 104 via line 111 and. transceiver 102 is shown coupled to outlet 105 via line 112. Thus, data may be transferred from transceiver 101 across lines 111 and 114 through circuit panel 103 and to transceiver 102 via lines 115 and 112. Transceiver 101 and 102 may also be coupled with a cell 107 and 108 such as the apparatus described in U.S. Pat. No. 4,944,143 or other device. The cell or other device 107 may be coupled to transceiver 101 in order to supply data for transmission across the power distribution network. Similarly, a cell or other device 108 may be coupled to a transceiver 102 in order to receive the data transmitted by transmitter 101. It will be apparent to those skilled in the art that a cell does not necessarily need to be used as a data source or a data sink. Other types of sources for digital data may be coupled to transceivers 101 and 102. Similarly, a processor may be included within transceivers 101 and 102. In addition, it will be apparent to those skilled in the art that transceiver 101 does not necessarily need to be coupled to an outlet receptacle 104 such as that illustrated in FIG. 1. For example, transceiver 101 may be embedded within receptacle 104 in order to transmit and/or receive data via power line 114. It should also be noted that transceiver 101 is identical in structure to transceiver 102 as shown in FIG. 1. The internal architecture and function of the transmitter section and the receiver section of transceiver 101 will be described in more detail below.

There are numerous sources of noise and other transients associated with power line distribution systems that make it difficult to receive and/or reconstruct signals from a PLC transmitter. For instance, television sets have been found to produce a substantial degree of noise on the power line distribution network. Other sources of noise include light dimmers, intercoms, electric motors, and numerous other types of electronic or electric devices. Consequently, the receiver 123 acting in concert with transmitter 120 must be able to isolate valid data from the noise on the power line distribution network.

A significant source of AC power line interference emanates from television receivers. The primary interference emanates from a television receiver during a fixed, repetitive portion of the AC line cycle (60 Hz in the United States and 50 Hz in European countries). In the United States, this interference has a fundamental frequency equal to the NTSC horizontal scan rate, which is well controlled to 15.734 KHz, and is impulsive in nature. The interference has harmonics extending up into the MHz region, although they are typically filtered, in televisions manufactured after 1982, above 450 KHz to accommodate FCC conducted emissions regulations. In European television sets, interference pulses occur at approximately 15.625 KHz intervals. Each pulse has an associated and typically consistent width.

Figure 2:
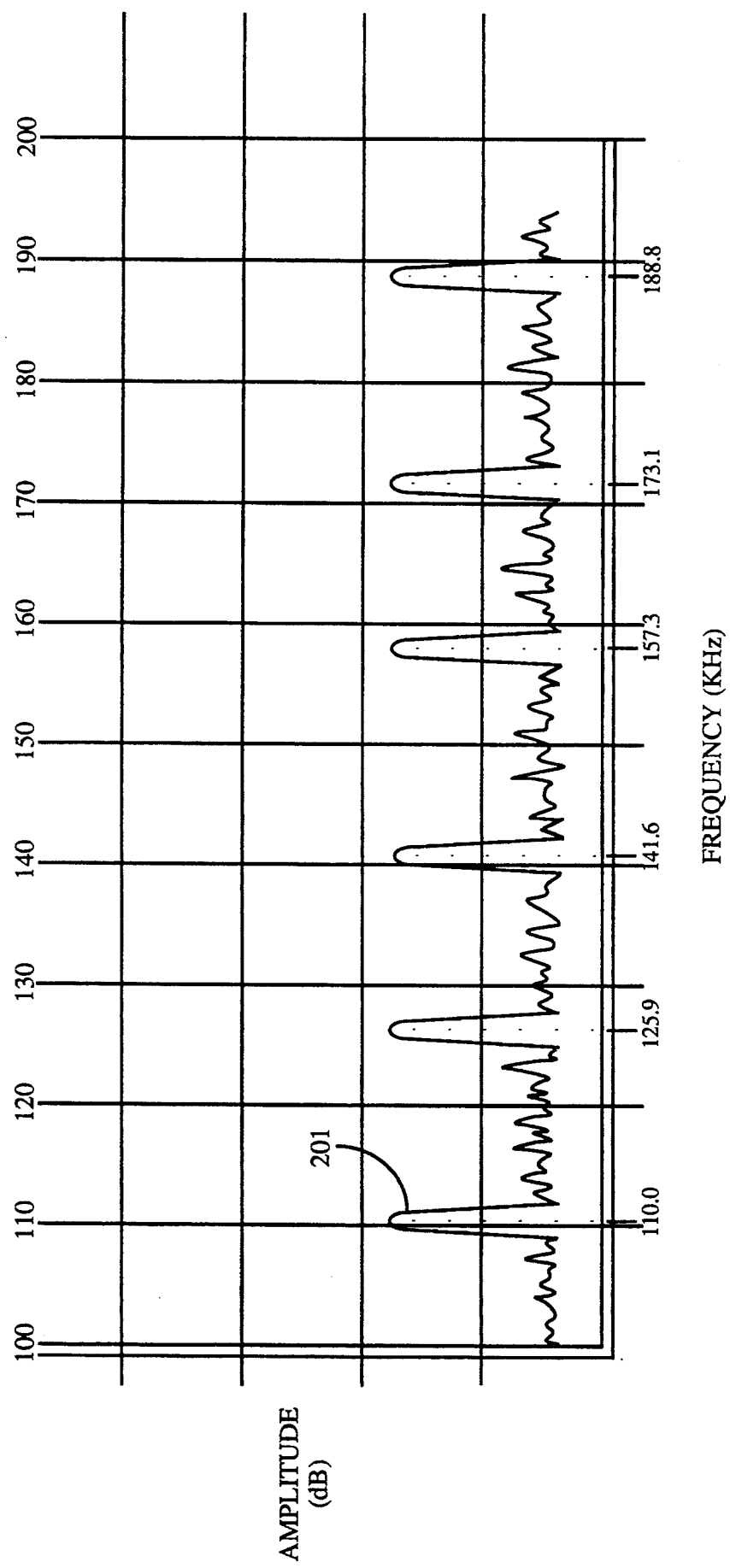
FIG. 2 is a graph of the harmonic interference pattern produced by an NTSC television.

Referring to FIG. 2, a graph of the interference harmonics produced on a typical NTSC television receiver is depicted. As shown, interference harmonics occur at integer multiples of the 15.734 KHz fundamental frequency. The seventh harmonic 201 is shown to occur at approximately 110.138 KHz, the eighth harmonic at approximately 125.872 KHz, and the ninth harmonic at approximately 141.606 KHz. Interference in European television receivers is shifted slightly due to the difference in the fundamental frequency of the raster scan.

In order to transmit data on a power line containing the interference as shown in FIG. 2, the PLC apparatus of the present invention uses redundant carriers at a frequency between the television interference harmonics. In the preferred embodiment, the first carrier is positioned at 118 KHz and the redundant carrier is positioned at 133.7 KHz for the PLC apparatus designed for use in the United States. Other carrier frequencies are used for other countries in order to avoid interference harmonics at a slightly different frequency. The use of a redundant carrier scheme is the subject of a co-pending patent application Ser. No. 07/698,292, filed May, 10, 1991, and assigned to the Assignee of the present invention. By positioning the carrier between the interference harmonics, the potential for disruption of data communications is substantially minimized.

Overall Description of the Transmitter of the Preferred Embodiment

Figure 3:
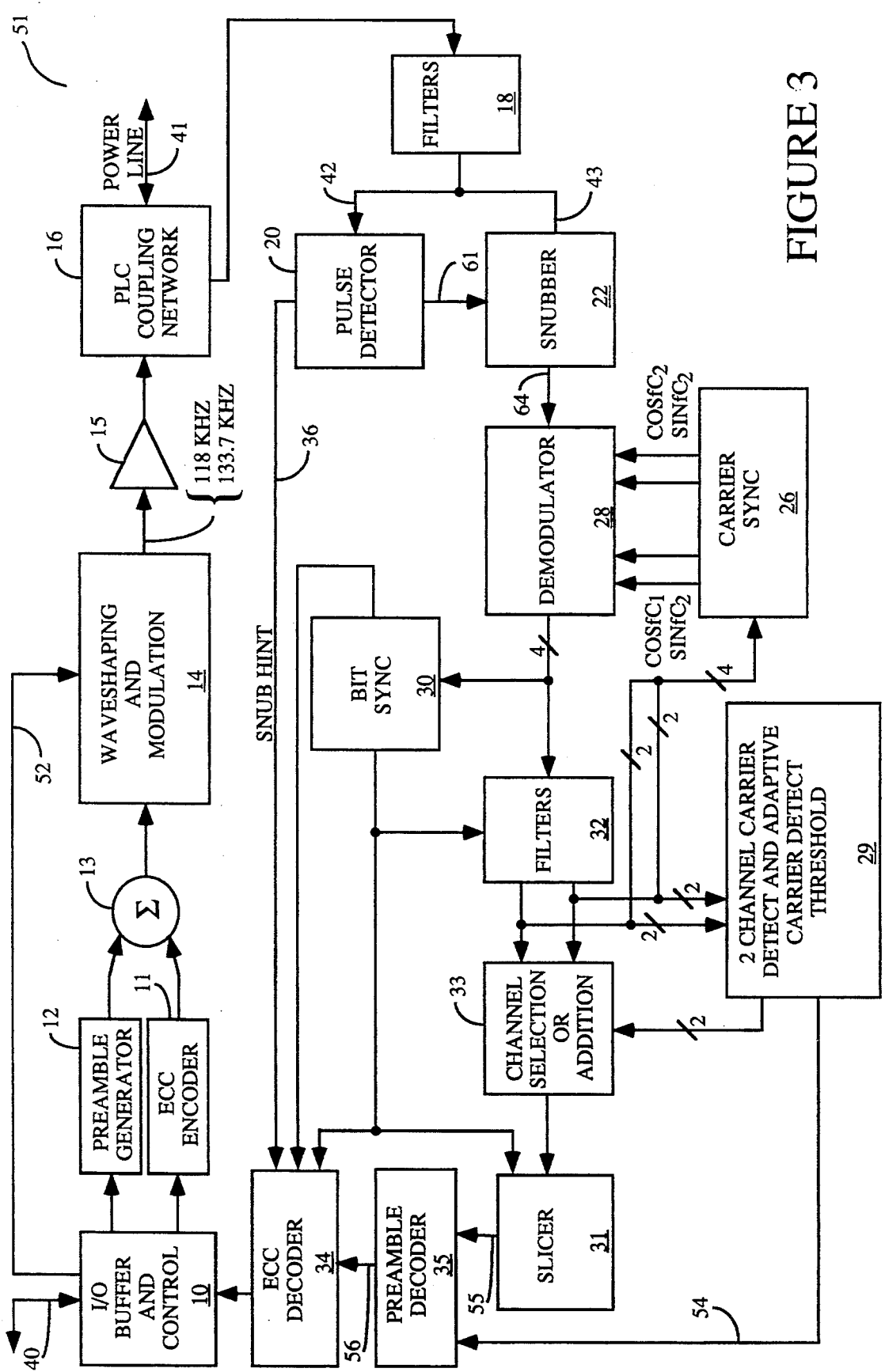
FIG. 3 is a block diagram of the transceiver of the present invention.

Referring now to FIG. 3, a block diagram of the circuitry within transceiver 101 and 102 is depicted. While in the above discussion, a separate transmitter and receiver are discussed, typically the transmit and receive functions are combined into a single device as shown in FIG. 3. The upper portion of the block diagram in FIG. 3 corresponds to the transmit section of the PLC apparatus of the present invention while the lower portion of FIG. 3 is the receive section. This latter section receives signals over the power line 41, processes them, then couples the resultant digital signal to the I/O buffer and control circuit 10. From there, the signals are coupled over lines 40 to a cell or other device. The lines 40 may communicate with a cell such as the apparatus described in U.S. Pat. No. 4,944,143. The input/output buffer 10 provides ordinary coupling between the cell or other device and the PLC apparatus of the present invention.

I/O buffer and control circuit 10 includes control logic for clocking data to or from a cell or other device. I/O buffer and control circuit 10 also includes control and timing logic for interfacing with a bit error rate tester (BER tester). The BER tester can be used as a diagnostic tool for verifying the proper operation of the PLC apparatus 51 shown in FIG. 3. If the transceiver 51 is coupled to the bit error rate tester, the interface logic within the I/O buffer and control circuit 10 supplies clocking information to the bit error rate tester that informs the tester when to output the next bit of data to the transceiver 51. If transceiver 51 is coupled to a cell, the cell provides bit timing information and framing information to the control logic in I/O buffer and control circuit 10 so that the interface logic can frame the data and clock it out properly to preamble generator 12 and error correcting code (ECC) encoder 11.

The data received over lines 40 is passed to an error correcting code encoder 11. ECC encoder 11 is an error correcting encoder that combines data with error correction information. The data is encoded, in the currently preferred embodiment, with a Hamming code. The encoding may be done in an ordinary manner, however, since 8-bit data words are encoded, means are provided for incorporating "dummy" or placeholder bits with each byte both during encoding and. decoding as described in copending application Ser. No. 07/698,445, filed May 10, 1991, assigned to the Assignee of the present application. Data is transmitted from the cell onto the power line in packets with the preamble generator 12 providing a preamble for each of the packets. At summer 13 the preamble is positioned in front of the packets of encoded data from the encoder 11. Consequently, the summer 13 performs a multiplexing function in that it selects either the data or preamble. Details of the preamble generator 12 of the currently preferred embodiment are described in co-pending application Ser. No. 07/698,445, filed May 10, 1991, assigned to the Assignee of the present application.

The output of the summer 13 is coupled to a waveshaping and modulating circuit 14. In the currently preferred embodiment, this circuit includes a read-only-memory, digital-to-analog converter and two filters. (The filters in the integrated circuit embodiment of the present invention are switched capacitor filters.) Detailed aspects of the waveshaping and modulation circuit 14 are described below.

With the invented apparatus, the data is transmitted in its entirety on two channels; that is, there is redundancy in the transmission. All the data (including the preamble) modulates both a 118 KHz carrier and a 133.7 KHz carrier for PLC devices designed for use in the United States. These carriers are specifically chosen at frequencies between the determinable interference harmonics of standard NTSC televisions as described above. Other carrier frequencies are used in other countries to comply with different regulations and other determinable interference harmonics.

Quadrature phase shift keying (QPSK) is used to modulate the carriers under most operations. However, binary phase shift keying (BPSK) is also used as described in the above-mentioned patent applications. In parts of the following description, emphasis is sometimes placed on the QPSK. It will be apparent to one skilled in the art that the invention can also be used with BPSK or other modulation techniques.

The output of the waveshaping and modulation circuit 14 is coupled to an amplifier 15 and from there to the power line 41 through a power line coupling network 16. In the preferred embodiment, a portion of the amplifier 15 and the entire network 16 are fabricated from discrete components even in the case where an integrated circuit is used to realize the PLC apparatus. (A portion of amplifier 15 and network 16 are external components to the integrated circuit.) The amplifier 15 and network 16 are described in co-pending application Ser. No. 07/678,525, May 10, 1991, filed and assigned to the Assignee of the present invention.

Waveshaping and Modulation Circuitry and its Operation

Referring again to FIG. 3, a waveshaping and modulation circuit 14 is shown coupled to the output side of summer 13. The waveshaping and modulation circuit 14 generates the modulated data waveform for output over power line 41. It will be apparent to those with ordinary skill in the art that many prior art methods exist for generating a modulated waveform. A common multiplier is one way to combine a data signal with a carrier. The waveshaping and modulation circuit 14 is the method employed in the preferred embodiment for generating the modulated data waveform.

One additional signal provided by I/O buffer and control circuit 10 is a control signal 52 that controls the timing of a digital to analog converter (DAC) that generates the transmit waveform. This control signal 52 is described below in conjunction with the logic illustrated in FIG. 4.

Figure 4:
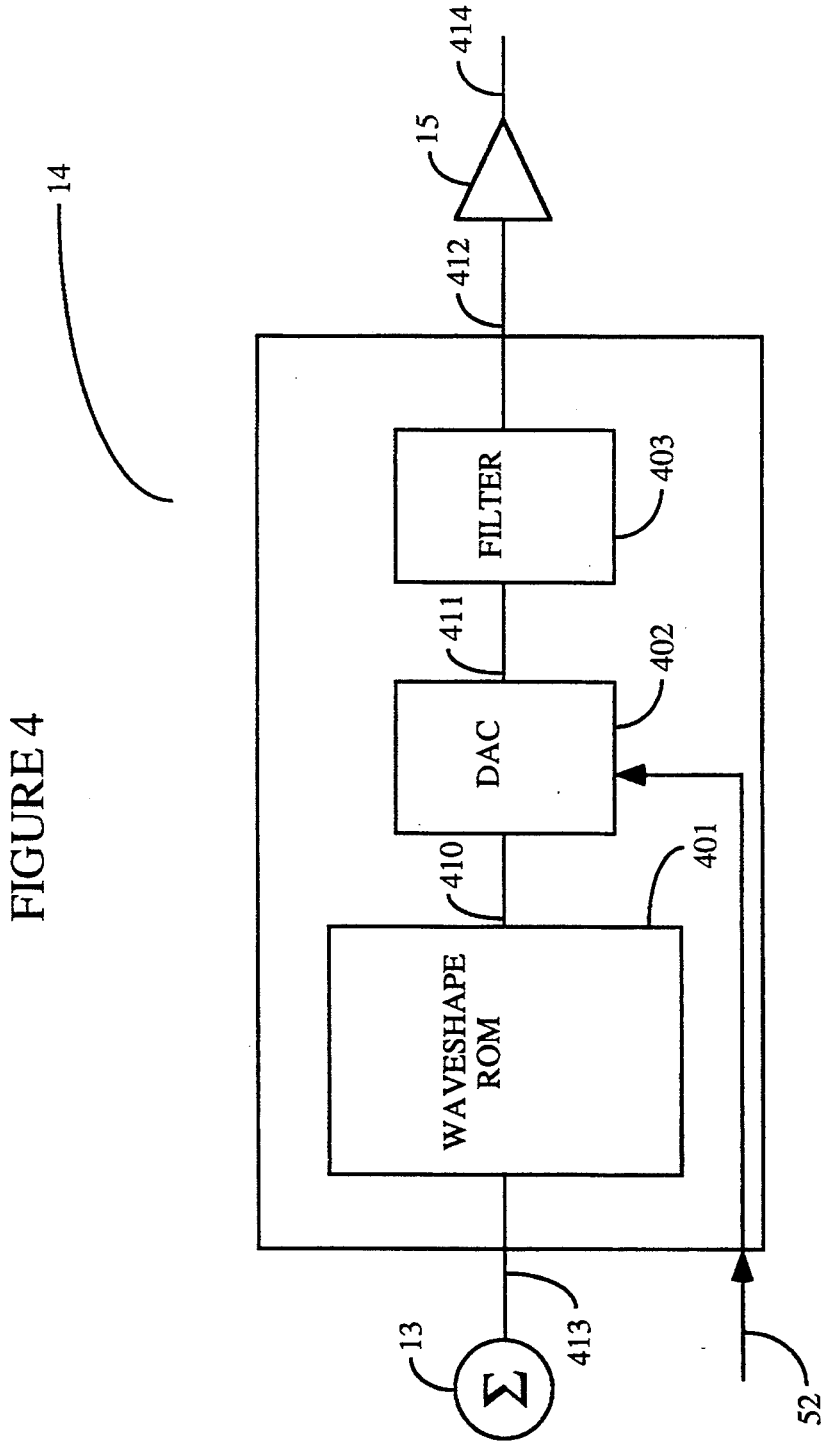
FIG. 4 is an illustration of the wave shaping and modulation circuitry of the present invention.

Referring now to FIG. 4, the internal structure of waveshaping and modulation circuit 14 is shown in detail. In the preferred embodiment, waveshape ROM 401 is a read only memory device for storing samples that represent the appearance of the carrier waveshape. The preferred embodiment of the PLC apparatus is a phase modulated system. Two forms of phase modulation are used. BPSK (Binary Phase Shift Keyed) and QPSK (Quadrature Phase Shift Keyed). The use of these two forms of modulation and a means for detecting the form of modulation in use is the subject of a co-pending patent application Ser. No. 07/698,445, filed May 10, 1991, assigned to the Assignee of the present invention.

In a phase modulated system, waveshape ROM 401 stores samples for each phase of the carrier. For QPSK, there are four phases; thus, there are four carrier waveshapes for each of four different phases: an in-phase waveshape, a 180° out of phase waveshape, a +90° phase waveshape, and a −90° phase waveshape. Each of these different phase-dependent transmit patterns are stored in waveshape ROM 401.

In order to minimize intersymbol interference, additional storage space in waveshape ROM 401 is provided for storing a raised cosine waveform that is used to shape the data bits. The use of a raised cosine waveform, a technique well known in the art, requires some history to be maintained of the bits adjacent to the bit actually being transmitted. Thus, using a raised cosine technique, the previous bit influences the waveshape for the currently transmitted bit. The ROM space allocated for each of the four transmit wave patterns is therefore multiplied by four to account for the history of previously transmitted bits. Thus, with the combination of the four possible carrier phases for QPSK and the allocation for the raised cosine shaping, waveshape ROM 401 contains sixteen separate transmit waveshapes for operation in a U.S. power distribution network.

For each of these sixteen different transmit patterns, 256 discrete time points are stored in waveshape ROM 401 for representing each of the sixteen transmit waveshapes. In order-to generate a desired modulated carrier, one of the sixteen transmit patterns is selected and the associated 256 discrete points defining the waveform are output from waveshape ROM 401 via interface 410 to digital to analog converter (DAC) 402 for conversion to an analog waveform. The sixteen different transmit waveshapes may be represented by four bits and the 256 time points for each waveshape can be represented by an additional eight bits. In this way, waveshape ROM and DAC 402 can be used to generate a data modulated carrier whose transmit spectrum fits between television interference harmonics or other determinable interference harmonics.

Additional memory space is provided in waveshape ROM 401 for storing sets of waveshapes corresponding to carriers that avoid either U.S. or European television interference. Since the harmonic interference is slightly different for European versus U.S. television receivers, the waveshapes stored in waveshape ROM 401 are slightly different depending on the presence of a U.S. or European television set on the power line network. An additional bit is used for selecting between the U.S. and European standard. In summary, the line 413 between summer 13 and waveshape ROM 401 is a 13 bit line in the preferred embodiment. Four bits are used to select one of sixteen different transmit patterns for QPSK operation, eight bits are used to select the discrete sample points for the selected carrier, and one bit is used to select between and U.S. and European standards. Thus, line 413 contains a total of 13 address lines for selecting the appropriate carrier waveshape.

As described above, once the appropriate waveshape is selected from waveshape ROM 401, the 256 discrete points of the waveshape are clocked out interface line 410 to DAC 402. DAC 402 is a standard digital to analog converter commonly available and well known in the art. Data is clocked into DAC 402 using control line 52 on which a DAC start signal is transmitted from I/O buffer and control circuit 10. The analog output from DAC 402 is fed to filter 403 via line 411. Filter 403 is provided to smooth the waveshape produced by the stairstep response of DAC 402. The output of filter 403 on line 412 is fed to an amplifier 15. As illustrated in FIG. 3, the input to amplifier 15 includes two modulated carriers set at frequencies between determinable television interference harmonics. Specifically, the carriers produced for amplifier 15 are set at a frequency of 118 KHz and 133.7 KHz for United States operations. These modulated carriers are amplified by amplifier 15 and fed to a PLC coupling network for isolating and coupling the signal onto power line 41. The PLC coupling network 16 is the subject of a co-pending patent application Ser. No. 07/678,525, filed May 10, 1991, assigned to the Assignee of the present invention. Thus, the data is transmitted to a receiver on power line 41.

Overall Description of the Receiver of the Preferred Embodiment

Referring again to FIG. 3, the lower section of FIG. 3 represents the receive circuitry of PLC transceiver 51. When receiving information, input data is received by PLC coupling network 16 via power line 41. The input signal is filtered by filters 18. Filters 18 comprise switched capacitor filters for the integrated circuit embodiment of the present invention. Filters 18 comprise a high pass filter and a low pass filter. The high pass filter has a cut off frequency of approximately 100 KHz, and the low pass filter, a cut off frequency of approximately 320 KHz. The filters 18 thus pass the modulated carriers and additionally the filters 18 pass certain noise.

The pulse detector 20 receives the output of the filters 18. The detector 20 detects anomalies in the waveform such as noise pulses or other excursions of the waveform above or below certain threshold levels. For example, the pulse detector 20 detects noise associated with electronically-controlled light dimmers and other sources of high frequency pulses. The pulse detector 20 provides a snubber control signal to a snubber 22. The snubber 22 blanks or snubs the signals from filters 18 for predetermined periods when a pulse representing a disturbance (noise pulse) is present in the received signal.

The pulse detector 20 and snubber 22 are described in co-pending applications Ser. No. 07/698,602 & 07/698,600, filed May 10, 1991, assigned to the Assignee of the present invention. Note, as mentioned above, two carriers are used and hence two channels are needed; one for the 118 KHz signal and the other for the 133.7 KHz signal.

A carrier synchronization circuit 26 provides local oscillator signals both for in phase and quadrature phase to the demodulator 28. Hence, four signals are coupled from the carrier synchronization circuit 26 to the demodulator 28 (two for each channel). (Four signals are provided even for BPSK; the quadrature signals do not contain data, however.) The demodulator 28 under control of the output of carrier synchronization circuit 26, demodulates the two carrier signals and provides both an in-phase and quadrature phase demodulated signal for each of the two channels to the filters 32. The output of the demodulator 28 is also coupled to a bit (baud) synchronization circuit 30. This circuit provides baud synchronization to the decoder 34 as well as other circuits. The demodulator 28 and bit synchronization circuit 30 are ordinary, well-known circuits except as discussed herein.

The filters 32 comprise four matched filters, two for each channel. These filters 32 are used to separate the received data from determinable interference harmonics. The design and operation of filters 32 is described in detail below.

A two channel carrier detect and adaptive carrier detect threshold circuit 29 is coupled to the output of filters 32. Output signals from circuit 29 are provided to channel selection or addition circuit 33 and a preamble decoder 35 that decodes the preamble of a data packet and determines word sync for the packet. A carrier detect signal on line 54 is used for synchronizing the decoding of the preamble. Details of preamble decoder 35 are described in co-pending application Ser. No. 07/698,445, filed May 10, 1991, assigned to the Assignee of the present invention.

The output of the filters 32 is coupled to the channel selection or addition circuit 33. This circuit also receives two threshold level signals, one for each channel from the circuit 29. Within the channel selector 33, the data from one channel or the other is selected or the data in both channels is added together. (Note: the same data is present in both channels.) In summary, if the noise in one channel is high, relative to noise in the other channel, the channel with the lesser noise is selected. If the noise is both channels is approximately equal, the signals in the channels are added.

The output from circuit 33 is coupled to the slicer 31 where the waveform is converted to a digital form in an ordinary manner under control of the bit synchronization signal. The slicer 31 provides the binary 1 or 0 levels by detecting the signal level at a given time step.

The signal from slicer 31 is coupled to the preamble decoder 35 which is coupled to the ECC decoder 34. Here, it is determined whether an error occurred in the transmission and if so, it is corrected with a Hamming code. Additionally, a parity bit is transmitted with each word enabling the detection of a second error in each byte. The decoded data is coupled from the decoder 34 to the input/output buffer and control 10 and from there to the cell or other device over lines 40.

While in the above description analog signals are sometimes discussed since they are used in the currently preferred embodiment, the present invention may be realized using digital signal processing (DSP) techniques. For instance, the signal path from the input to filters 18 through the slicer 31 can be fabricated with DSP techniques.

Receive Filters and Their Operation

Figure 5:
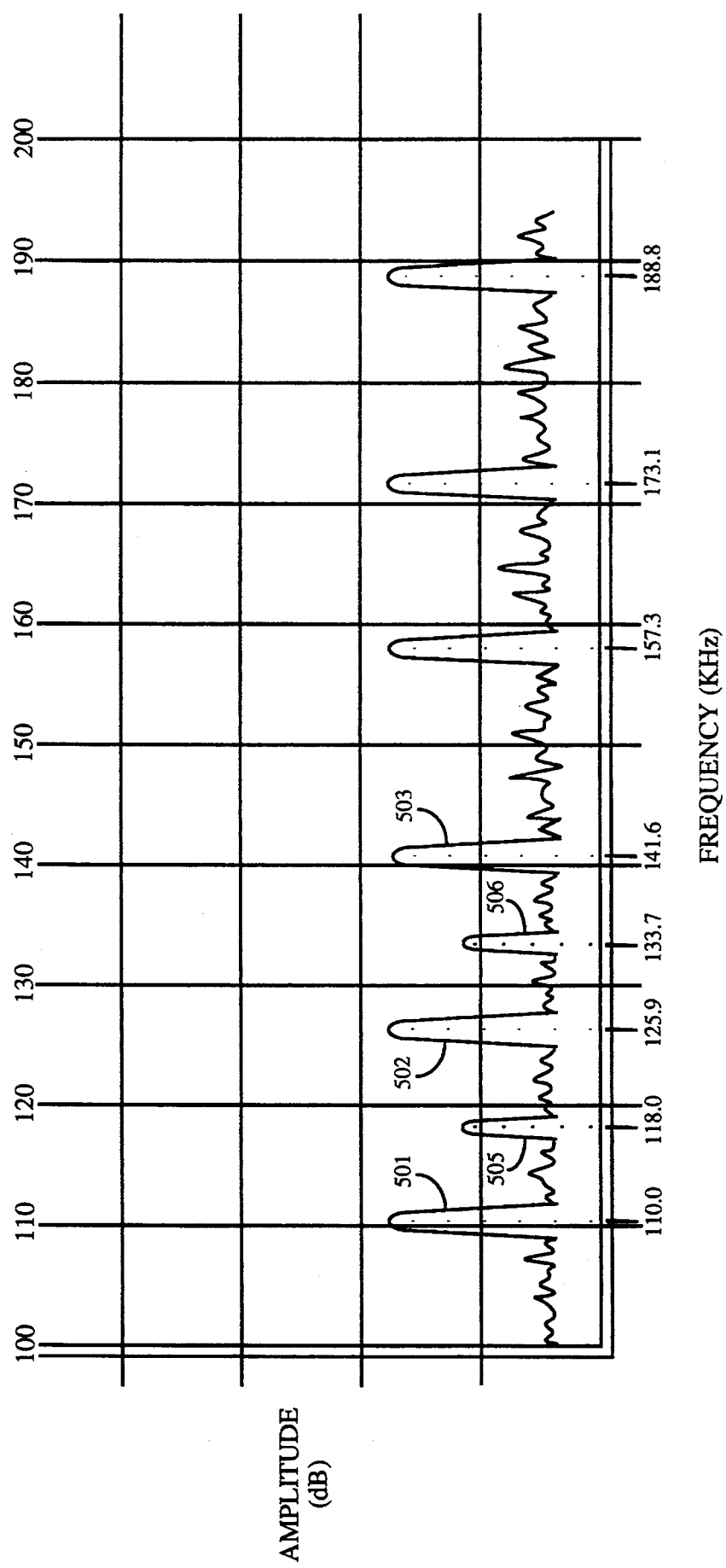
FIG. 5 is a graph of the harmonic interference pattern showing the embedded received signal.
Figure 6:
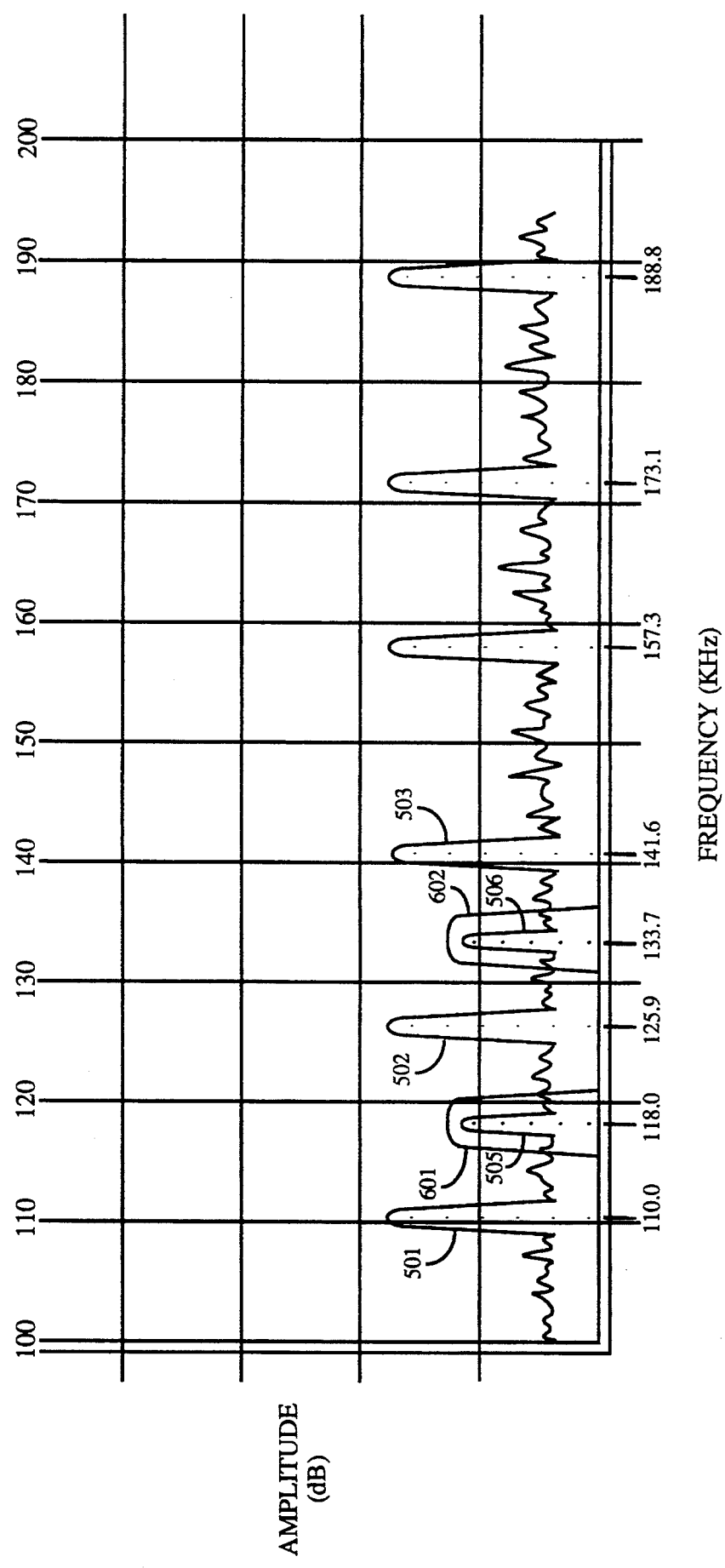
FIG. 6 illustrates the positioning of the receive filters used in the receiver of the present invention.

Referring still to FIG. 2, filters 32 are used to separate the received data from determinable interference harmonics. The filters 32 comprise four matched filters, two for each channel. These filters operate in cooperation with the waveshaping and modulation circuitry described above in order to capture the signals modulated between determinable interference harmonics such as television interference harmonics. Referring to FIG. 5, television interference harmonics (501,502, and 503) are shown with a data signal pair (505 and 506) modulated between the television interference harmonics by the waveshaping and modulation circuitry of the present invention. As shown in FIG. 5, data signals 505 and 506 are often of a smaller amplitude than the interference harmonics. The present invention includes filters 32 in the receiver which pass the data signal pair (505 and 506) but reject the interference harmonics. The positioning of these filters in the frequency spectrum corresponds to the frequency of the two carrier signals as shown in FIG. 6.

Figure 7:
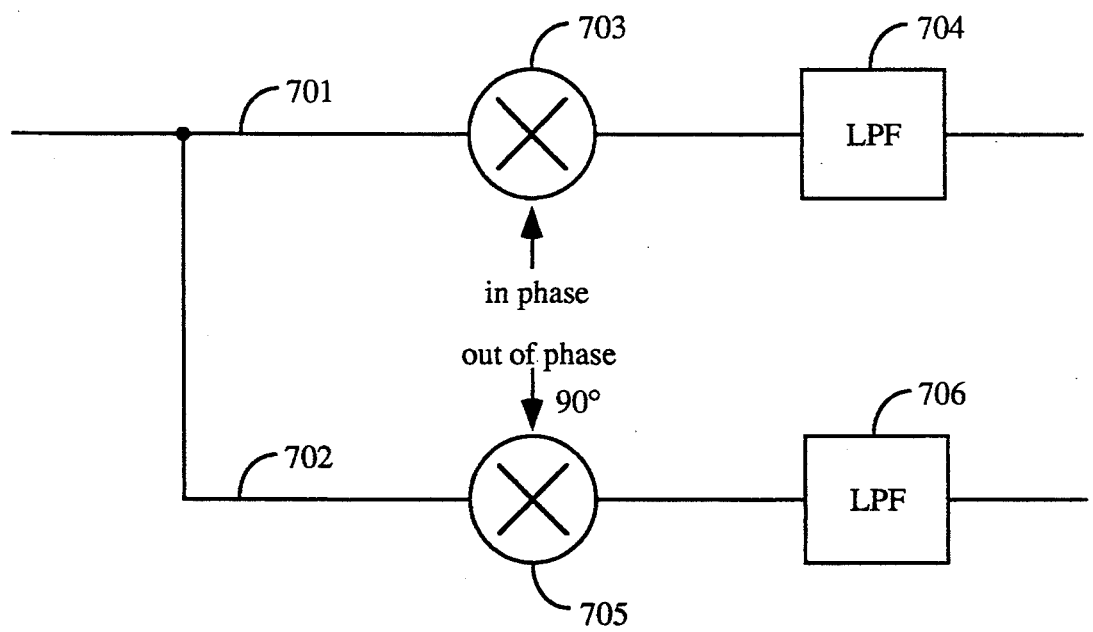
FIG. 7 is a block diagram of the design of the filters used in the receiver of the present invention.
Figure 8:
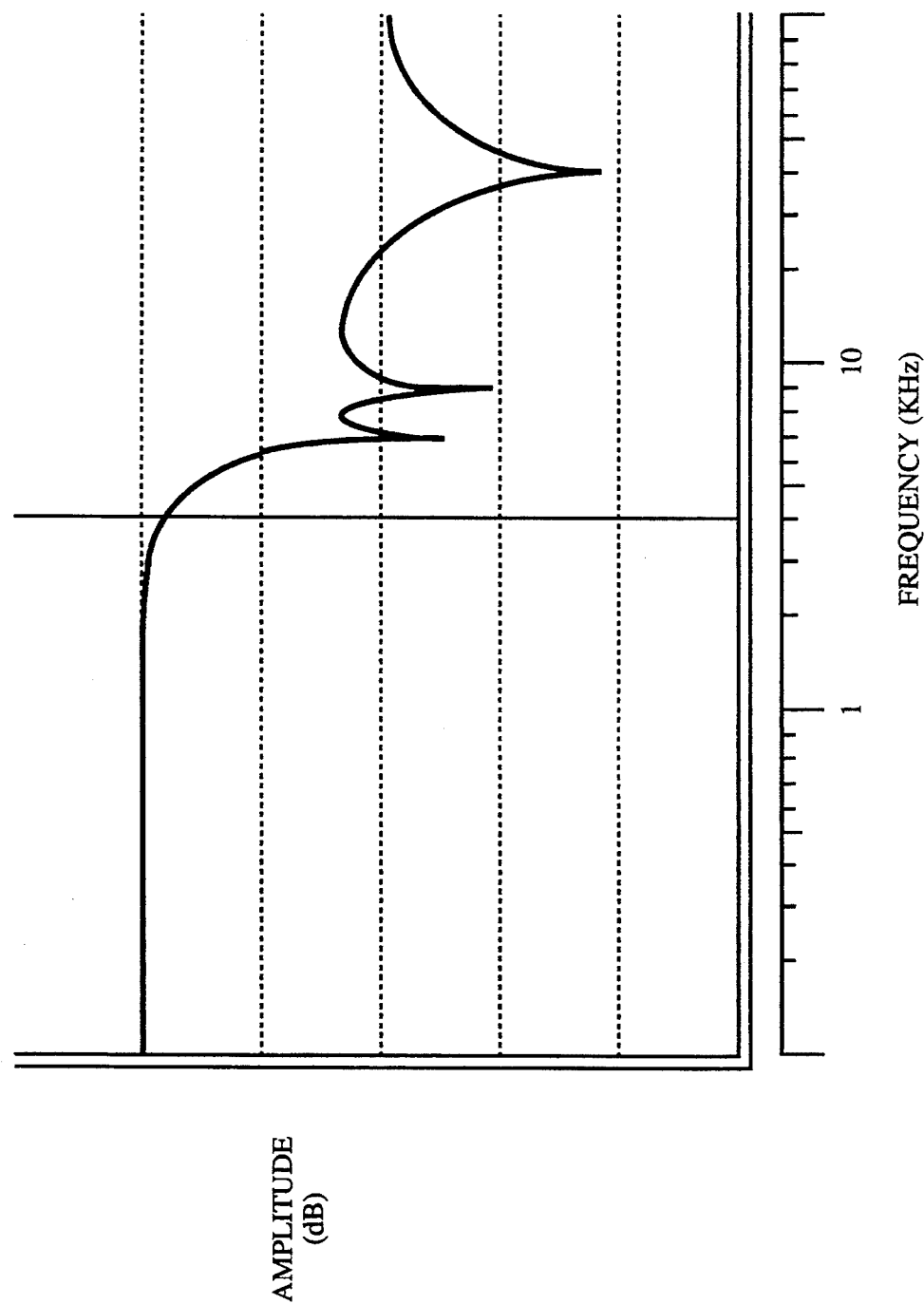
FIG. 8 illustrates the response of the filters used in the receiver of the present invention.

In the preferred embodiment, receive filters 32 are implemented as a pair of filter circuits each having a pair of synchronous demodulators and a pair of low pass filters. One filter circuit is used for each carrier frequency. One such filter circuit is illustrated in FIG. 7. Referring to FIG. 7, one of the two filter circuits of filters 32 is shown to comprise demodulators 703, 705 and low pass filters 704, 706. Two signals are present in each filter circuit: an in-phase signal (line 701) and a 90° out-of-phase signal (line 702). The two signals are provided for quadrature demodulation. Demodulator 703 feeds the in-phase signal to low pass filter 704 and demodulator 705 feeds the 90° out-of-phase signal to low pass filter 706. Low pass filters 704 and 706 reject interference harmonics by attenuating the input signal at a predetermined frequency. FIG. 8 shows the response created by the low pass filters used in the preferred embodiment. As the signal is attenuated, the determinable interference harmonics are rejected by the receiver for each of the two carrier frequencies.

Thus, a power line communication (PLC) apparatus wherein a carrier is derived to avoid determinable interference harmonics is described.

Although this invention has been shown in relation to a particular embodiment, it should not be considered so limited. Rather, it is limited only by the appended claims.

What is claimed is:

1. A power line communication (PLC) apparatus comprising:
   an input buffer for accepting input data from a data source;
   a modulation circuit, coupled to said input buffer, for generating a carrier signal at a predetermined frequency, said predetermined frequency being between interference harmonics, said modulation circuit further including a circuit for modulating said input data at a predetermined symbol duration with said carrier signal, said modulation circuit further including a waveshaping memory for storing a digital representation of said carrier signal, said predetermined carrier signal frequency and said predetermined symbol duration being arbitrarily selectable based on the digital information stored in said waveshaping memory;
   a transmitter, coupled to said modulation circuit, for transmitting said modulated input data on a power line, said modulated data being transmitted between said interference harmonics;
   a receiver for receiving said modulated data on said power line; and
   a filter means, coupled to said receiver, for filtering said modulated data to reject said interference harmonics while accepting said input data.

2. The power line communication (PLC) apparatus as claimed in claim 1 wherein said waveshaping memory is a waveshaping read only memory (ROM).

3. The power line communication (PLC) apparatus as claimed in claim 1 wherein said waveshaping memory for storing said digital representation of each phase of said carrier signal.

4. The power line communication (PLC) apparatus as claimed in claim 1 wherein said waveshaping memory further comprises means for storing a digital representation of a raised cosine waveform.

5. The power line communication (PLC) apparatus as claimed in claim 1 wherein said waveshaping memory further comprises means for storing a digital representation of a carrier signal for avoiding said interference harmonics in NTSC television receivers.

6. The power line communication (PLC) apparatus as claimed in claim 1 wherein said waveshaping memory further comprises means for storing a digital representation of a first carrier signal and a second carrier signal, said first carrier signal for avoiding interference harmonics in NTSC television receivers, said second carrier signal for avoiding interference harmonics in non-NTSC television receivers.

7. The power line communication (PLC) apparatus as claimed in claim 6 wherein said receiver further includes a circuit for demodulating one of said input data using one of said first and second carrier signals.

8. The power line communication (PLC) apparatus as claimed in claim 1 wherein said filter means includes a pair of low pass filter circuit wherein each of said filter circuit for attenuating a predetermined frequency associated with said interference harmonics.

9. The power line communication (PLC) apparatus as claimed in claim 8 wherein each of said filter circuit further includes two low pass filters for each of two predetermined carrier signals, each of said low pass filter attenuating one of two predetermined frequencies ranges associated with said interference harmonics.

10. The power line communication (PLC) apparatus as claimed in claim 1 wherein said modulation circuit further includes a circuit for generating a plurality of redundant carrier signals, each being between said interference harmonics.

* * * * *